United States Patent
Yen et al.

(10) Patent No.: US 11,732,146 B2
(45) Date of Patent: Aug. 22, 2023

(54) LIQUID INK CONTAINING POLYTETRAFLUOROETHYLENE WAX EMULSION

(71) Applicant: Hewlett-Packard Development Company, L.P., Houston, TX (US)

(72) Inventors: Max Yen, San Diego, CA (US); Alex Trubnikov, Petach Tiqwa (IL); Shimrit Rubin, Netanya (IL); Or Pinkesfeld, Netanya (IL); Marisa Samoshin, San Diego, CA (US); Yi-Hua Tsao, San Diego, CA (US); Eytan Cohen, Raanana (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 1282 days.

(21) Appl. No.: 16/311,086

(22) PCT Filed: Oct. 10, 2016

(86) PCT No.: PCT/US2016/056300
§ 371 (c)(1),
(2) Date: Dec. 18, 2018

(87) PCT Pub. No.: WO2018/070986
PCT Pub. Date: Apr. 19, 2018

(65) Prior Publication Data
US 2020/0087523 A1    Mar. 19, 2020

(51) Int. Cl.
*C09D 11/322* (2014.01)
*C09D 175/04* (2006.01)
*C09D 11/023* (2014.01)
*C08K 5/053* (2006.01)
*C08K 5/06* (2006.01)
*C08K 5/521* (2006.01)
*C08L 27/18* (2006.01)
*C09D 17/00* (2006.01)

(52) U.S. Cl.
CPC ............ *C09D 11/023* (2013.01); *C08K 5/053* (2013.01); *C08K 5/06* (2013.01); *C08K 5/521* (2013.01); *C08L 27/18* (2013.01); *C09D 11/322* (2013.01); *C09D 17/001* (2013.01); *C09D 175/04* (2013.01); *C08K 2201/003* (2013.01)

(58) Field of Classification Search
CPC .. C09D 11/322; C09D 17/001; C09D 175/04; C09D 11/023; C08K 5/053; C08K 2201/003; C08K 5/06; C08K 5/521; C08L 27/18
USPC .................................................. 106/31, 31.26
See application file for complete search history.

(56) References Cited

U.S. PATENT DOCUMENTS

| | | |
|---|---|---|
| 5,889,083 A | 3/1999 | Zhu |
| 8,915,993 B2 | 12/2014 | Drappel et al. |
| 9,249,329 B2 | 2/2016 | Lee et al. |
| 2012/0083566 A1 | 4/2012 | Deiner et al. |
| 2013/0053485 A1 | 2/2013 | Misawa et al. |
| 2015/0191031 A1 | 7/2015 | Ohta et al. |

FOREIGN PATENT DOCUMENTS

| | | | |
|---|---|---|---|
| CN | 105017851 | 11/2015 | |
| CN | 103992689 B | 3/2016 | |
| EP | 2934894 | 10/2015 | |
| WO | WO-9810025 | 3/1998 | |
| WO | WO-2009009285 | 1/2009 | |
| WO | WO-2010147589 | 12/2010 | |
| WO | WO-2010147589 A1 * | 12/2010 | ........... C09D 11/322 |
| WO | WO-2014098879 | 6/2014 | |
| WO | WO 2017171728 | 10/2017 | |
| WO | WO 2018017085 | 1/2018 | |

OTHER PUBLICATIONS

Data Sheet for DuPont PTFE TE-3887, published Jan. 2007 (Year: 2007).*
Choo, J, "Micronised PTFE in Printing inks a Technology Review", Oct. 14, 2009, http://www.inkworldmagazine.com/issues/2003-04/view_features/micronised-ptfe-in-printing-inks--a.
International Search Report and Written Opinion for International Application No. PCT/US2016/056300 dated Jun. 29, 2017, 6 pages.

* cited by examiner

*Primary Examiner* — Kelechi C Egwim
(74) *Attorney, Agent, or Firm* — Dierker & Kavanaugh, P.C.

(57) ABSTRACT

An example of a liquid ink includes a pigment dispersion, a polyurethane dispersion, a polytetrafluoroethylene wax emulsion, a co-solvent, and a balance of water. A particle diameter of a polytetrafluoroethylene wax in the polytetrafluoroethylene wax emulsion is less than 50 nm. Examples of the liquid ink may be incorporated into a thermal inkjet printing system.

17 Claims, 2 Drawing Sheets

LIQUID INK CONTAINING POLYTETRAFLUOROETHYLENE WAX EMULSION

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings.

DETAILED DESCRIPTION

Figure 1A:
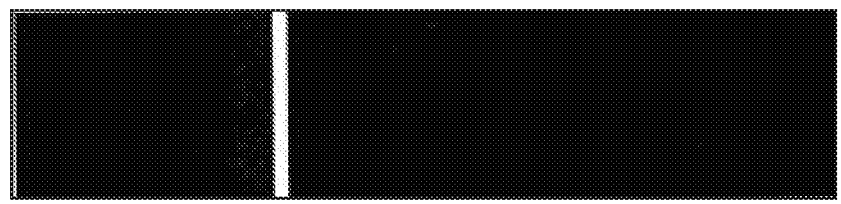
FIGS. 1A and 1B depict an area-fill print for an example of the liquid ink disclosed herein and an area-fill print for a comparative ink (respectively) after nozzles up capped storage.

In thermal inkjet printing, wax emulsions may be added to thermal inkjet inks to improve the durability of the resulting print film. In particular, wax emulsions may improve the abrasion resistance of the resulting print film. However, incorporating wax emulsions into thermal inkjet inks may lead to complications with thermal inkjet print nozzle health and reliability. For example, the presence of a wax emulsion in a thermal inkjet ink may cause clogging of manufacturing filters and printer filters. Clogged filters may restrict the ink flow rate and cause a pressure drop on the back end of the filter. The presence of a wax emulsion in a thermal inkjet ink may also cause the formation of agglomerates in printhead nozzles. The agglomerates may be formed from wax particles, either alone or in combination with colorants (e.g., pigment particles). Whether agglomerates form when printheads are stored nozzles down or nozzles up may depend on the specific gravity of the wax particles. When printheads are stored nozzles down, wax particles with a higher specific gravity may settle and form agglomerates in the nozzles. When printheads are stored nozzles up, wax particles with a lower specific gravity may cream (float upwards) and form agglomerates in the nozzles.

During printing, thermal inkjet printhead nozzles are heated and exposed to air, which can cause the evaporation of volatile ink components and the precipitation of agglomerates containing wax in the printhead nozzles. Such agglomerates in printhead nozzles may prevent proper printhead firing, and operational downtime may be required so that the printhead may be serviced to remove the agglomerates.

Disclosed herein is a liquid ink, which may be digitally printed with a thermal inkjet printhead on a substrate. The liquid ink includes a polytetrafluoroethylene (PTFE) wax emulsion. Also disclosed herein is an over-print varnish, which may be digitally printed with a thermal inkjet printhead on a substrate, and which includes the PTFE wax emulsion. The PTFE wax emulsion includes a PTFE wax which has a particle diameter that is less than 50 nm. Incorporating the PTFE wax emulsion, including the PTFE wax with a particle diameter less than 50 nm, in the liquid ink or the over-print varnish improves the health and reliability of the thermal inkjet print nozzles that are dispensing the liquid ink or the over-print varnish. For example, the incorporation of the PTFE wax emulsion into the liquid ink or the over-print varnish may lead to improved filterability, reduced agglomerate formation, and improved agglomerate recoverability in thermal inkjet print nozzles. While not being bound by any theory, it is believed that the liquid ink and the over-print varnish may each be reliably printed (even though each includes a wax emulsion) because of the chemical structure and particle diameter of the PTFE wax used in the PTFE wax emulsion.

The PTFE wax does not cream like other comparable waxes (e.g., polyethylene waxes). Thus, the liquid ink or the over-print varnish, including the PTFE wax emulsion, is less likely to form agglomerates in printhead nozzles when the printheads are stored nozzles up (as compared to other comparable inks including other waxes, e.g., polyethylene waxes). The PTFE wax also has higher melting and softening points than other comparable waxes (e.g., polyethylene waxes). It is believed that the higher melting and softening points of the PTFE wax make it less likely that the PTFE wax will break from its emulsion during thermal inkjet printing, when the thermal inkjet printhead nozzles are heated and exposed to air. Thus, the liquid ink or the over-print varnish, including the PTFE wax emulsion, may have reduced agglomerate formation in thermal inkjet printhead nozzles during printing and may also be less likely to form agglomerates that are difficult to remove with servicing (as compared to other comparable inks including other waxes, e.g., polyethylene waxes).

The PTFE wax particles having a particle diameter that is less than 50 nm also settle slower than PTFE wax particles with a larger particle diameter. Thus, fewer agglomerates may be formed when the printheads are stored nozzles down. The PTFE wax having a particle diameter that is less than 50 nm may also be less likely to clog filters than a PTFE wax with a larger particle diameter. Thus, the filterability of the liquid ink or the over-print varnish may be improved (over similar inks, including waxes with larger particle diameters) by incorporating PTFE wax having a particle diameter that is less than 50 nm.

Further, using the PTFE wax having a particle diameter that is less than 50 nm may allow for a reduction in the amount of the PTFE wax emulsion that would otherwise be incorporated in the liquid ink or the over-print varnish in order to achieve a threshold level of print film durability. When the PTFE wax has a particle diameter that is less than 50 nm, the particles of the PTFE wax have a large surface area to weight ratio, such that there is more coverage of the PTFE wax in a print film than there would be with a larger particle diameter at an equivalent weight (or % actives). It is believed that the greater coverage of the smaller PTFE wax particles in the print film leads to better and more consistent durability. In contrast, to achieve better coverage, and thus better durability, with larger PTFE wax particles, a higher weight percentage of the particles may have to be used (e.g., greater than 1% actives). However, a higher weight percentage of larger particles can deleteriously affect the jetting reliability. The reduction in the amount of the PTFE wax emulsion in the liquid ink or the over-print varnish (e.g., to an amount ranging from about 0.25% actives to about 1% actives) allows for further improvement in the health and reliability of the thermal inkjet print nozzles (e.g., improved filterability, reduced agglomerate formation, and improved agglomerate recoverability) that are dispensing the liquid ink or the over-print varnish.

In an example, the liquid ink disclosed herein includes the PTFE wax emulsion in an amount ranging from about 0.25% actives to about 1% actives. In an example, the over-print varnish disclosed herein includes the PTFE wax emulsion in an amount ranging from about 0.25% actives to about 1% actives. The "% actives" represents the solids level of a particular component (e.g., wax, pigment, polyurethane, etc.). The raw material of the component may be an emulsion or dispersion, and the amount of the emulsion or dispersion that is added to the liquid ink or the over-print varnish is enough to achieve a solids level that is the % actives (e.g., 4 grams of a 50% solids wax emulsion is included in a 100 gram ink to obtain 2% actives; 2%*100 grams/50% solids=4 grams).

As used herein, the term "filterability" may refer to the rate at which an ink or varnish is able to travel through a filter and/or the amount of ink or varnish that is able to be passed through the filter before the filter clogs. As used herein, "agglomerate formation" may refer to the amount of precipitates that have accumulated in a printhead nozzle during a set time period. Also as used herein, "agglomerate recoverability" may refer to the amount of precipitates that may be removed from a printhead nozzle by mechanically servicing the printhead. Servicing may include nozzle spitting, wiping with dry polyester fabric, wiping with a water-wetted polyester fabric, flushing with de-ionized water, or combinations thereof.

Additionally, each of the liquid ink containing the PTFE wax emulsion and the over-print varnish containing the PTFE wax emulsion demonstrates acceptable stability.

The liquid ink disclosed herein, which includes the PTFE wax emulsion, is a liquid, and may be included in a single cartridge set or a multiple-cartridge set. In the multiple-cartridge set, any number of the multiple inks may have the PTFE wax emulsion incorporated therein. As used herein, the terms "liquid ink" "ink(s)" and "ink composition" refer to the liquid ink including the PTFE wax emulsion, which contains the PTFE wax having a particle diameter that is less than 50 nm.

In an example, the liquid ink disclosed herein includes a pigment dispersion, a polyurethane dispersion, the PTFE wax emulsion, a co-solvent, and a balance of water. In some examples, the liquid ink consists of these components, with no other components. In other examples, the liquid ink may include different and/or additional components.

As used herein, the terms "ink vehicle," "liquid vehicle," and "vehicle" may refer to the liquid fluid in which the pigment (e.g., a pigment dispersion), the polyurethane (e.g., a polyurethane dispersion), and the PTFE wax emulsion are placed to form the liquid ink(s). A wide variety of liquid vehicles may be used with the ink set(s) of the present disclosure. The ink vehicle may include water alone or in combination with a variety of additional components. Examples of these additional components may include co-solvent(s), surfactant(s), antimicrobial agent(s), and/or anti-kogation agent(s).

The ink vehicle may include co-solvent(s). The co-solvent(s) may be present in an amount ranging from about 2 wt % to about 20 wt % (based on the total wt % of the liquid ink). In an example, the vehicle includes a glycol ether co-solvent. The glycol ether co-solvent may be present in an amount ranging from about 2 wt % to about 12 wt % (based on the total wt % of the liquid ink). The ink vehicle may also include additional co-solvent(s). When the ink vehicle includes additional co-solvent(s) as well as the glycol ether co-solvent, the total amount of the additional co-solvent(s) and the glycol ether co-solvent present in the liquid ink agent may range from about 5 wt % to about 20 wt % (based on the total wt % of the liquid ink). It is to be understood that other amounts outside of these examples and ranges may also be used.

Examples of the glycol ether co-solvent include glycol alkyl ethers, propylene glycol alkyl ethers, and higher homologs ($C_6$-$C_{12}$) of polyethylene glycol alkyl ethers. Glycol ether co-solvents can have the molecular formula of R'—O—$CH_2CH_2$OH, where R' is a $C_1$-$C_7$ liner, branched, or cyclic alkyl group. In some examples, a single glycol ether co-solvent can be used. In other examples, a combination of glycol ether co-solvents can be used. In one specific example, the glycol ether can include ethylene glycol monobutyl ether. In other specific examples, the glycol ether can include tripropyleneglycol methyl ether, dipropylene glycol butyl ether, and/or propylene glycol phenyl ether.

In another example, the co-solvent may be a humectant. An example of a suitable humectant is LIPONIC® EG-1 (LEG-1, glycereth-26, available from Lipo Chemicals). Other examples of humectants may include polyols, such as 1,2-hexanediol, 1,3-propanediol, glycerol, tri-ethylene glycol, and combinations. Other humectants can also be used. The humectant may be the sole co-solvent that is present in the ink vehicle, or the humectant may be included in the vehicle in addition to other co-solvents. In an example, the humectant may be added to the liquid ink in an amount ranging from about 2 wt % to about 12 wt % (based on the total wt % of the liquid ink).

The liquid vehicle of the liquid ink may also include surfactant(s). The surfactant may be present in an amount ranging from about 0.25 wt % to about 4 wt % (based on the total wt % of the liquid ink). In an example, the surfactant may include an acetylenic surfactant and/or a phosphate surfactant.

In an example, the ink vehicle includes the acetylenic surfactant, and the acetylenic surfactant is non-ionic. In this example, the acetylenic surfactant may be present in an amount ranging from about 0.25 wt % to about 2 wt % (based on the total wt % of the liquid ink). Acetylenic surfactants can include acetylenic diols, alkoxylated acetylenic diols, and other acetylenic surfactants. Some specific examples include 2,7-dimethyl-4-octyn-3,6-diol, 7-tetradecyn-6,9-diol, 2,4,7,9-tetramethyl-5-decyne-4,7-diol, 1,4-dimethyl-1,4-bis(2-methylpropyl)-2-butyne-1,4-diyl ether, ethylene or propylene oxide condensates thereof, or a combination thereof. Some suitable commercially available acetylenic surfactants include SURFYNOL® and DYNOL™ surfactants available from Air Products.

In another example, the ink vehicle includes the phosphate surfactant. In this example, the phosphate surfactant may be present in an amount ranging from about 0.25 wt % to about 2 wt % (based on the total wt % of the liquid ink). In some examples, the phosphate surfactant can be a phosphate ester of fatty alcohols or fatty alcohol alkoxylates. In one example, the surfactant can be a mixture of mono- and diesters, and may have an acid number ranging from 50 to 150. In another example, the phosphate-containing surfactant can be of the CRODAFOS family. Specific examples include oleth-3 phosphate, oleth-10 phosphate, oleth-5 phospahte, dioleyl phosphate, ppg-5-ceteth-10 phosphate, $C_9$-$C_{15}$ alkyl monophosphate, deceth-4 phosphate, and mixtures thereof. Other specific examples by tradename include CRODAFOS N3A, CRODAFOS N3E, CRODAFOS N10A, CRODAFOS HCE, CRODAFOS SG, ARLANTONE Map 950, MONOFAX 831, MONOFAS 1214, MONALUBE 215, and ATLOX DP13/6.

The liquid vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, and combinations thereof. In an example, the liquid ink may include a total amount of antimicrobial agents that ranges from about 0.1 wt % to about 0.25 wt %. In some instances, the antimicrobial agent may be present in the pigment dispersion that is added to the other ink components.

An anti-kogation agent may also be included in the ink vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3 A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the liquid ink in an amount ranging from about 0.1 wt % to about 1 wt % of the total wt % of the liquid ink. In the examples disclosed herein, the anti-kogation agent may improve the jettability of the liquid ink.

In some examples disclosed herein, the ink vehicle of the liquid thermal inkjet ink may also include viscosity modifier(s), material(s) for pH adjustment, sequestering agent(s), preservative(s), jettability additive(s), and the like.

The liquid ink may be any color, such as black, cyan, magenta, yellow, etc. As such, in addition to the ink vehicle, the liquid ink also includes a colorant.

In an example, the colorant is an anionically dispersed pigment. In an example, the anionically dispersed pigment is a dispersion including water, the pigment, and an anionic polymer that disperses the pigment (i.e., the anionic polymeric dispersant). In an example, the pigment dispersion may also include, for example, a co-solvent, such as 2-pyrrolidone. The pigment dispersion may be prepared or purchased, and the other components of the ink (e.g., vehicle components) may be slowly added to the pigment dispersion with continuous mixing, to form the ink composition/liquid ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C. I. Vat Blue 4, and C. I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C. I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

The average particle size of the pigments may range anywhere from about 50 nm to about 200 nm. In an example, the average particle size ranges from about 80 nm to about 150 nm.

The total amount of pigment dispersion in the liquid ink ranges from about 2% actives to about 5% actives (based on the total wt % of the liquid ink). This weight percentage accounts for the weight percent of active pigment present in the liquid ink, and does not account for the total weight percent of the pigment dispersion in the liquid ink. As such, the weight percentages given for the pigment dispersion do not account for any other components (e.g., water) that may be present when the pigment is part of the dispersion.

As mentioned above, in some examples disclosed herein, the pigment may be dispersed by the anionic polymer (i.e., anionic polymeric dispersant). The dispersant may be present in an amount ranging from about 0.1 wt % to about 5 wt % of a total wt % of the liquid ink.

The liquid thermal inkjet ink may also include the polyurethane. In an example, the polyurethane is present in the polyurethane dispersion with water. The polyurethane dispersion is present in the ink in an amount ranging from about 1% actives to about 15% actives based upon the total wt % of the liquid ink. This weight percentage accounts for the weight percent of active polyurethane present in the liquid ink, and does not account for the total weight percent of the polyurethane dispersion in the liquid ink. As such, the weight percentages given for the polyurethane dispersion do not account for any other components (e.g., water) that may be present when the polyurethane is part of the dispersion. The polyurethane dispersion may be added with the pigment (e.g., pigment dispersion) and the components of the ink vehicle to form the liquid thermal inkjet ink.

Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a copolymer thereof, and a combination thereof.

As mentioned above, the polytetrafluoroethylene (PTFE) wax emulsion is included in the liquid ink. The PTFE wax emulsion includes a polytetrafluoroethylene (PTFE) wax. In some examples, the PFTE wax emulsion and the liquid ink exclude all other waxes besides the PTFE wax.

As mentioned above, the liquid ink, including the PTFE wax emulsion, may be less likely to form agglomerates than inks including other wax emulsions. This may be, in part, because the PTFE wax does not cream like other comparable waxes (e.g., polyethylene waxes), and thus, the liquid ink, which includes the PTFE wax, may be less likely to form agglomerates in printhead nozzles when the printheads are stored nozzles up. The reduction in agglomerate formation may also be due, in part, to the higher melting and softening points of the PTFE wax (as compared to other waxes, e.g., polyethylene waxes), which may render the PTFE wax less likely to break from its emulsion when the liquid ink is heated during thermal inkjet printing. Thus, the liquid ink, including the PTFE wax emulsion, may have reduced agglomerate formation (as compared to other comparable inks including other waxes, e.g., polyethylene waxes) in thermal inkjet printhead nozzles both during storage and printing.

The particle size of the PTFE wax in the PTFE wax emulsion may also affect the likelihood that the liquid ink will form agglomerates. When the PTFE wax has a particle diameter that is less than 50 nm, the PTFE wax particles may be less likely to settle in the liquid ink (as compared to PTFE wax particles with a larger particle diameter), and thus, the liquid ink may be less like to form agglomerates (as compared to other inks including PTFE wax particles with a particle diameter larger than 50 nm) when the printheads are stored nozzles down.

Additionally, the particle size of the PTFE wax in the PTFE wax emulsion may also affect the stability and filterability of the liquid ink. When fewer PTFE wax particles settle, the liquid ink is more stable, and thus, when the PTFE wax has a particle diameter that is less than 50 nm, the liquid ink may be more stable (as compared to other comparable inks including PTFE wax particles with a particle diameter larger than 50 nm). Similarly, when the PTFE wax has a particle diameter that is less than 50 nm, the liquid ink may also be less likely to clog filters than a PTFE wax with a larger particle diameter, and thus, the filterability of the liquid ink may be improved (as compared to other comparable inks including PTFE wax particles with a particle diameter larger than 50 nm).

As used herein, the terms "particle diameter" and "particle size", refer to the diameter of a substantially spherical particle (i.e., a spherical or near-spherical particle having a sphericity of >0.84), or the average diameter of a non-spherical particle (i.e., the average of multiple diameters across the particle). The PTFE wax in the PTFE wax emulsion may have a particle size that is less than 50 nm. In an example, the PTFE wax emulsion and the liquid ink are free from PTFE wax particles with a particle diameter equal to or greater than 50 nm.

The wax emulsion also includes an emulsifier to stabilize the wax emulsion. The emulsifier may be present in an amount suitable to stabilize the wax emulsion. In an example, the emulsifier used to stabilize the wax emulsion is a non-ionic emulsifier. In another example, the emulsifier used to stabilize the wax emulsion may be an anionic emulsifier. If the emulsifier were to be a cationic emulsifier, the cationic emulsifier would be susceptible to flocculation by the anionic components (e.g., an anionic polymeric dispersant) of the liquid ink.

The PTFE wax emulsion may be present in the liquid ink in an amount ranging from about 0.25% actives to about 1% actives (based on the total wt % of the liquid ink). It is to be understood that in some examples the liquid ink may include other amounts of the PTFE wax emulsion outside of this range. This weight percentage accounts for the weight percent of active PTFE wax present in the liquid ink, and does not account for the total weight percent of the PTFE wax emulsion in the liquid ink. As such, the weight percentages given for the PTFE wax emulsion do not account for any other components (e.g., water) that may be present when the PTFE wax is part of the emulsion.

The PTFE wax emulsion may be added with the polyurethane (polyurethane dispersion), the pigment (e.g., pigment dispersion), and the other components of the ink vehicle to form the liquid thermal inkjet ink. The balance of the liquid ink is water.

After the liquid ink is prepared, the liquid ink may be applied to a substrate using a thermal inkjet printer. A thermal inkjet printhead may be filled with the liquid ink, and the liquid ink may be digitally printed on the substrate. The substrate may be coated or uncoated paper.

The over-print varnish disclosed herein, which includes the PTFE wax emulsion, is a liquid, and may be included in a single cartridge set or a multiple-cartridge set. In the multiple-cartridge set, at least one cartridge may include the over-print varnish and any number of the other cartridges may include the liquid ink. As used herein, the terms "over-print varnish" "varnish(es)" and "varnish composition" refer to the over-print varnish including the PTFE wax emulsion, which contains the PTFE wax having a particle diameter that is less than 50 nm.

In an example, the over-print varnish disclosed herein includes the polyurethane dispersion, the PTFE wax emulsion, the co-solvent, and a balance of water. In some examples, the liquid ink consists of these components, with no other components. In other examples, the liquid ink may include different and/or additional components. Examples of these additional components may include surfactant(s), anti-microbial agent(s), and/or anti-kogation agent(s). The over-print varnish may include any component in any amount described above in reference to the liquid ink except for the pigment dispersion. In some examples, the over-print varnish excludes colorants, such as pigments and/or dyes. As such, the over-print varnish is clear or substantially colorless, and may be used to form a protective and/or glossy coating on a printed image.

As mentioned above, the polytetrafluoroethylene (PTFE) wax emulsion is included in the over-print varnish. The PTFE wax emulsion and the polytetrafluoroethylene (PTFE) wax included in the over-print varnish are, respectively, the PTFE wax emulsion and PTFE wax described above in reference to the liquid ink. In some examples, the over-print varnish excludes all other waxes besides the PTFE wax.

The PTFE wax emulsion may be present in the over-print varnish in an amount ranging from about 0.25% actives to about 1% actives (based on the total wt % of the over-print varnish). It is to be understood that in some examples the over-print varnish may include other amounts of the PTFE wax emulsion outside of this range. This weight percentage accounts for the weight percent of active PTFE wax present in the over-print varnish, and does not account for the total weight percent of the PTFE wax emulsion in the over-print varnish. As such, the weight percentages given for the PTFE wax emulsion do not account for any other components (e.g., water) that may be present when the PTFE wax is part of the emulsion.

After the over-print varnish is prepared, the over-print varnish may be applied to a substrate using a thermal inkjet printer. An ink may be digitally printed directly on the substrate, and the over-print varnish may be digitally printed on top of the ink (which may or may not be exposed to a drying process). A thermal inkjet printhead may be filled with the over-print varnish, and the over-print varnish may be digitally printed over the ink on the substrate. The substrate may be coated or uncoated paper.

Also disclosed herein is a thermal inkjet printing system. The inkjet printing system includes the liquid ink and a thermal inkjet printhead, including at least one thermal inkjet print nozzle. In an example of the thermal inkjet printing system, the thermal inkjet printhead is filled with the liquid ink.

The liquid ink of the thermal inkjet printing system may be the liquid ink described above. In an example, the liquid ink of the inkjet printing system includes the pigment dispersion, the polyurethane dispersion, the PTFE wax emulsion, where a particle diameter of the PTFE wax in the PFTE wax emulsion is less than 50 nm, the co-solvent, and a balance of water. In another example, the liquid ink of the inkjet printing system ink further includes the humectant, the phosphate surfactant, and the acetylenic surfactant. In an example, the PTFE wax emulsion is present in the liquid ink in an amount ranging from about 0.25% actives to about 1% actives.

The thermal inkjet printhead of the thermal inkjet printing system may be any suitable thermal inkjet printhead. The thermal inkjet printhead includes at least one thermal inkjet print nozzle, and may include any number of additional thermal inkjet print nozzles.

It is to be understood that a similar thermal inkjet printing system may include the over-print varnish and the thermal inkjet printhead. In an example of the thermal inkjet printing system, the thermal inkjet printhead is filled with the over-print varnish.

Also disclosed herein is a method. The method includes incorporating the PTFE wax emulsion in the liquid ink. The PTFE wax of the PTFE wax emulsion incorporated into the liquid ink has a particle diameter that is less than 50 nm. In an example, the incorporation of the PTFE wax emulsion includes incorporating from about 0.25% actives to about 1% actives of the PTFE wax emulsion in the liquid ink.

The liquid ink of the method may be the liquid ink described above prior to the addition of the PTFE wax emulsion. In an example, the liquid ink, into which the PTFE wax emulsion is incorporated, includes the pigment dispersion, the polyurethane dispersion, the co-solvent, and water.

In another example, the method may further include jetting the liquid ink with a thermal inkjet print nozzle.

In still another example, the method may improve thermal inkjet print nozzle health and reliability (e.g., measured by filterability, agglomerate formation, and agglomerate recoverability) as compared to thermal inkjet print nozzles that jet comparative inks containing comparative wax emulsions.

It is to be understood that a similar method includes incorporating the PTFE wax emulsion in the over-print liquid. The PTFE wax of the PTFE wax emulsion incorporated into the over-print varnish has a particle diameter that is less than 50 nm. In an example, the incorporation of the PTFE wax emulsion includes incorporating from about 0.25% actives to about 1% actives of the PTFE wax emulsion in the over-print varnish.

The over-print varnish of the method may be the over-print varnish described above prior to the addition of the PTFE wax emulsion. In an example, the over-print varnish, into which the PTFE wax emulsion is incorporated, includes the polyurethane dispersion, the co-solvent, and water.

In another example, the method may further include jetting the over-print varnish with a thermal inkjet print nozzle.

In still another example, the method may improve thermal inkjet print nozzle health and reliability (e.g., measured by filterability, agglomerate formation, and agglomerate recoverability) as compared to thermal inkjet print nozzles that jet comparative over-print varnishes containing comparative wax emulsions.

To further illustrate the present disclosure, example(s) are given herein. It is to be understood that these example(s) are provided for illustrative purposes and are not to be construed as limiting the scope of the present disclosure.

Example

One example of the liquid thermal inkjet ink was prepared with a polytetrafluoroethylene (PTFE) wax emulsion. The particle diameter of the PTFE wax in the PTFE wax emulsion ranged from 10 nm to 50 nm. Four comparative inks were also prepared. The example ink and each of the comparative inks had the same general formulation except for the type and particle diameter of the wax incorporated therein. The type and particle diameter of the wax in the example ink and each of the four comparative inks is shown below in Tables 2-5. The general formulation of the example ink and the four comparative inks, except for the type and particle diameter of the wax incorporated therein, is shown in Table 1, with the wt % of each component that was used. The weight percentages of the pigment dispersion (labeled carbon black dispersion), the polyurethane dispersion (labeled PU dispersion), and the wax emulsion (labeled wax emulsion) represent the % actives, i.e., the total pigment solids, the total polyurethane solids, and the total wax solids present in the final formulations.

TABLE 1

| Component | Amount (wt %) |
|---|---|
| PU dispersion | 3.50 |
| Glycol Ether Co-solvent | 5.00 |
| Humectant (additional co-solvent) | 2.00 |
| Phosphate Surfactant | 0.50 |
| Acetylenic Surfactant | 0.40 |
| Wax emulsion | 1.00 |
| Carbon Black dispersion | 2.75 |
| Water | Balance |

The example ink and each comparative ink were tested for agglomerate formation. To test for agglomerate formation, the inks were loaded into printheads. The printheads were capped and stored for 3 days. For each ink, a printhead was stored nozzles up and a printhead was stored nozzles down. Then, an area-fill (two solid areas of color separated by an area with no color) was printed using each printhead.

The type and particle diameter of the wax contained in each ink and the results of the agglomerate formation tests for each ink are shown in Table 2.

TABLE 2

| Ink | Wax Type | Wax Particle Diameter (nm) | Nozzles Up Capped Storage | Nozzles Down Capped Storage |
|---|---|---|---|---|
| Example Ink | Polytetrafluoroethylene | 10-50 | Healthy Nozzles | Healthy Nozzles |
| Comparative Ink 1 | None | — | Healthy Nozzles | Healthy Nozzles |
| Comparative Ink 2 | Polyethylene | 200-500 | Nozzles Out | Healthy Nozzles |
| Comparative Ink 3 | Polytetrafluoroethylene | 200-500 | Healthy Nozzles | Nozzles Out |
| Comparative Ink 4 | Polytetrafluoroethylene | >1000 | Healthy Nozzles | Nozzles Out |

Figure 1B:
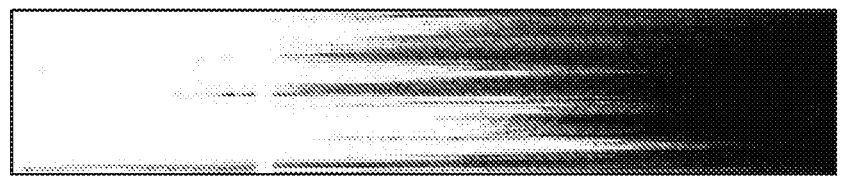
Figure 2A:
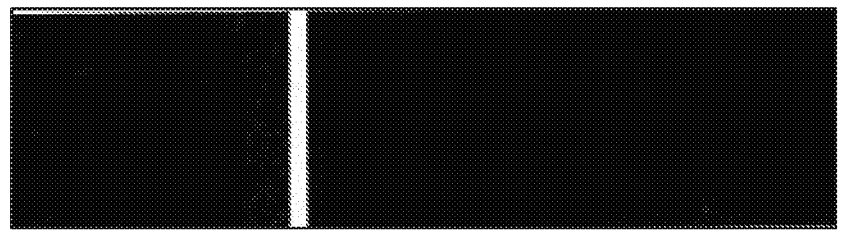
FIG. 2A depicts an area-fill print for an example of the liquid ink disclosed herein after nozzles down capped storage.
Figure 2B:
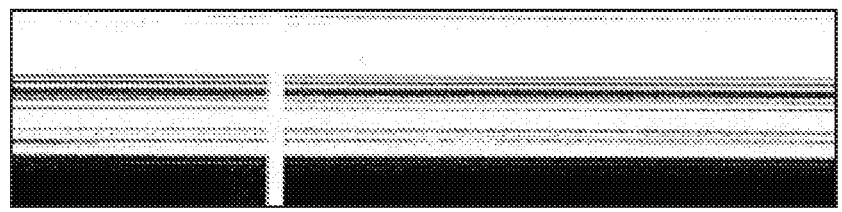
FIGS. 2B and 2C depict area-fill prints for two comparative inks after nozzles down capped storage.
Figure 2C:
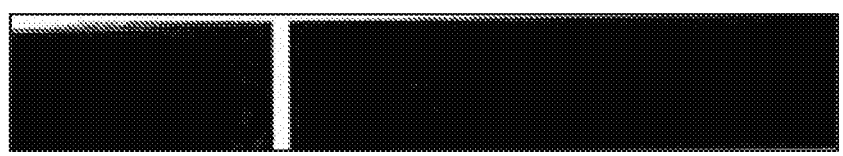

As shown in Table 2, the printheads for example ink and comparative ink 1 had healthy nozzles after both nozzles up and nozzles down capped storage. The example ink is the only ink containing wax that had printheads with healthy nozzles after both nozzles up and nozzles down capped storage. FIG. 1A shows the area-fill print for the example ink after nozzles up capped storage, and FIG. 2A shows the area-fill print for the example ink after nozzles down capped storage. As illustrated in these figures, the black ink printed in each of the two areas. The printhead with comparative ink 2 had nozzles out after nozzles up capped storage. FIG. 1B shows the area-fill print for comparative ink 2 after nozzles up capped storage. The white portion of the two areas indicates that several of the nozzles were out because the black ink was not dispensed. The printheads for comparative inks 3 and 4 had nozzles out after nozzles down capped storage. FIG. 2B shows the area-fill print for comparative ink 3 after nozzles down capped storage, and FIG. 2C shows the area-fill print for comparative ink 4 after nozzles down capped storage. Similar to FIG. 1B, the white portion(s) of the two areas in FIGS. 2B and 2C indicate that several of the nozzles were out because the black inks were not dispensed.

It is believed that the normal operation of the nozzles of the printheads containing comparative inks 2-4 was prevented, at least in part, due to the wax-containing agglomerates settling in the comparative inks. The larger particle diameter (d) of the wax-containing agglomerates in the comparative inks 2-4 contribute to the wax particles having an exponentially larger mass (as M=volume*density, $\rho,=(4/3)\pi(d/2)^3\rho$), which caused them to settle more quickly than the smaller wax-containing agglomerates in the example ink. The larger particles are also close in size to the printhead nozzles, which may contribute to nozzle occlusion.

The example ink and each comparative ink were also tested for uncapped heat stability and agglomerate recoverability (i.e., removal of the agglomerate to enable nozzle firing). To test for uncapped heat stability and agglomerate recoverability, the inks were loaded into printheads. The printheads were uncapped and stored nozzles up in a 60° C. oven for 3 hours. Then, each printhead was wiped and imaged.

The type and particle diameter of the wax contained in each ink and the results of the uncapped heat stability/agglomerate recoverability test for each ink are shown in Table 3.

TABLE 3

| Ink | Wax Type | Wax Particle Diameter (nm) | Uncapped Heat Stability/ Agglomerate Recoverability |
|---|---|---|---|
| Example Ink | Polytetrafluoroethylene | 10-50 | Clear Nozzles |
| Comparative Ink 1 | None | — | Clear Nozzles |
| Comparative Ink 2 | Polyethylene | 200-500 | Extensive Wax Precipitates |
| Comparative Ink 3 | Polytetrafluoroethylene | 200-500 | Clear Nozzles |
| Comparative Ink 4 | Polytetrafluoroethylene | >1000 | Clear Nozzles |

As shown in Table 3, the printheads for the example ink, comparative ink 1, comparative ink 3, and comparative ink 4 had clear nozzles, which are necessary for drop ejection and healthy print nozzle operation.

Figure 3A:
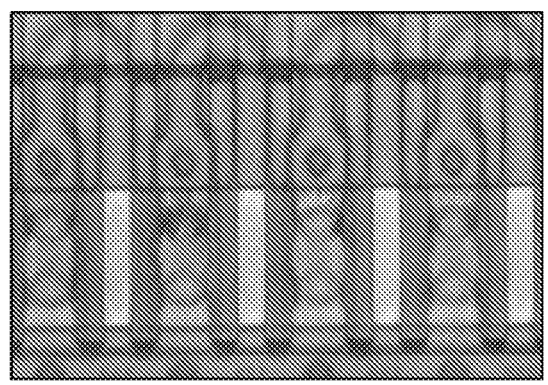
FIGS. 3A and 3B depict microscopic images of printhead nozzles after oven storage containing an example of the liquid ink disclosed herein and a comparative ink (respectively) and after wiping and imaging.
Figure 3B:
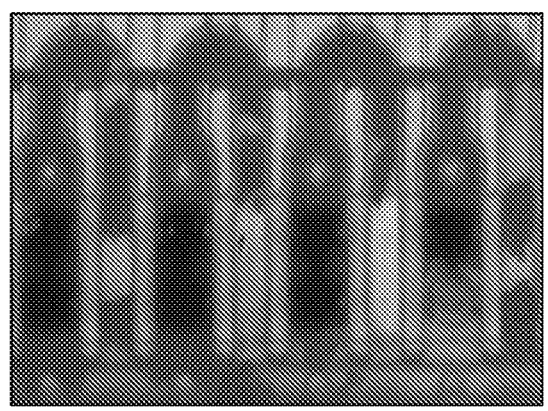

FIG. 3A shows a microscopic image of printhead nozzles after oven storage and wiping and imaging for the example ink. FIG. 3A shows that the printhead nozzles are clear. The printhead for comparative ink 2 had extensive and stubborn wax-containing precipitates/agglomerates. FIG. 3B shows a microscopic image of printhead nozzles after oven storage and wiping and imaging for comparative ink 2. FIG. 3B shows that the printhead nozzles are extensively occluded.

Figure 4A:
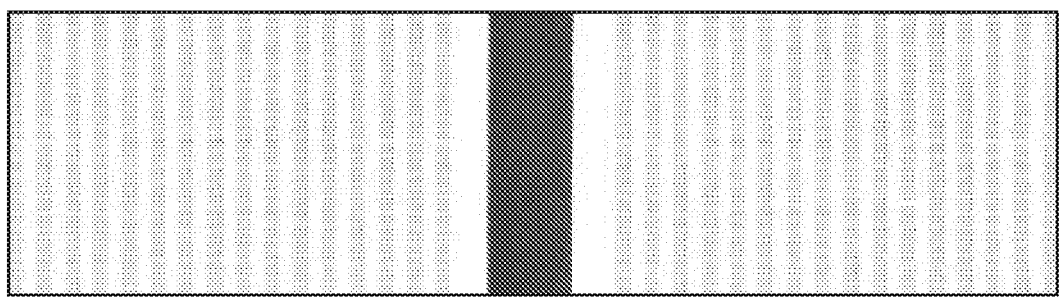
FIGS. 4A and 4B depict a nozzle health pattern for an example of the liquid ink disclosed herein and a nozzle health pattern for a comparative ink (respectively).
Figure 4B:
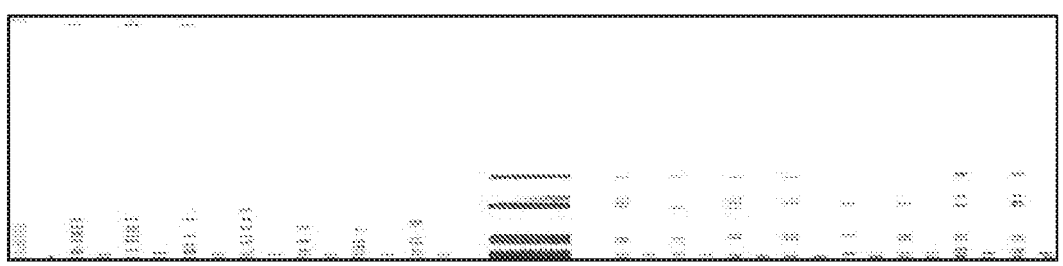

A nozzle health pattern was printed for the example ink and comparative ink 2 by telling all the nozzles of each printhead containing the respective inks to fire. The presence of agglomerates in the printhead nozzles may result in the non-firing of the nozzles, which is reflected in the nozzle health pattern. FIG. 4A shows the nozzle health pattern for the example ink, and FIG. 4B shows the nozzle health pattern for comparative ink 2.

It is noted that a comparative ink containing a polyethylene wax with a particle diameter of 10-50 nm was not tested for agglomerate formation or agglomerate recoverability/uncapped heat stability because polyethylene waxes with a particle diameter of 10-50 nm are known to not be jettable. Additionally, a comparative ink containing a polyethylene wax with a particle diameter of 10-50 nm would likely have uncapped heat stability/agglomerate recoverability test results similar to those of comparative ink 2.

The example ink and comparative ink 2 were tested for filterability. To test for filterability, the 7 ml of each ink were filtered through a glass fiber membrane at open air without added pressure (i.e., at 1 atm). The glass fiber membrane had a 2 cm diameter.

The type and particle diameter of the wax contained in each ink and the time it took to filter each ink are shown in Table 4.

TABLE 4

| Ink | Wax Type | Wax Particle Diameter (nm) | Time to Filter (s) |
|---|---|---|---|
| Example Ink | Polytetrafluoroethylene | 10-50 | 97 |
| Comparative Ink 2 | Polyethylene | 200-500 | 221 |

As shown in Table 4, the filterability of the example ink is better than the filterability of comparative ink 2.

The example ink and each comparative ink were also tested for durability. Each ink was used to print a solid black pattern on a Graph+ coated substrate, a coated white top substrate, and an uncoated white top substrate.

Each print was tested for abrasion durability. To test for abrasion durability, the prints were rubbed 200 times with a Sutherland® 2000™ rub tester (manufactured by Gardco). The damage to the print was graded visually using a scale of 1-5, with 5 indicating no damage seen and 1 indicating that the ink film was scraped off completely.

The type and particle diameter of the wax contained in each ink and the results of the abrasion durability test for each print are shown in Table 5.

TABLE 5

| Ink | Wax Type | Wax Particle Diameter (nm) | Graph+ | Coated White Top | Uncoated White Top |
|---|---|---|---|---|---|
| Example Ink | Polytetrafluoroethylene | 10-50 | 3 | 4 | 3 |
| Comparative Ink 1 | None | — | 2 | 1 | 2 |
| Comparative Ink 2 | Polyethylene | 200-500 | 3 | 4 | 3 |
| Comparative Ink 3 | Polytetrafluoroethylene | 200-500 | 1 | 1 | 1 |
| Comparative Ink 4 | Polytetrafluoroethylene | >1000 | 1 | 1 | 1 |

As shown in Table 5, the prints created with the example ink and comparative ink 2 have improved durability over the prints created with the other comparative inks (1, 3, and 4). While the durability values for comparative ink 2 are good, comparative ink 2 forms agglomerates during nozzles up capped storage, forms extensive and stubborn wax precipitates during uncapped heat stability testing, and has reduced filterability (as compared to the example ink) as shown above.

Thus, the example liquid thermal inkjet ink can reduce agglomerate formation, improve agglomerate recoverability, and improve filterability (as shown above) and maintain a threshold level of durability.

It is believed that the wax emulsions in the examples disclosed herein would, when incorporated into an example of the over-print varnish disclosed herein, behave in the same manner or in a substantially similar manner as they did in these examples.

It is to be understood that the ranges provided herein include the stated range and any value or sub-range within the stated range. For example, a range from about 0.25% actives to about 1% actives should be interpreted to include not only the explicitly recited limits of about 0.25% actives to about 1% actives, but also to include individual values, such as 0.35% actives, 0.5% actives, 0.75% actives, 0.85% actives, etc., and sub-ranges, such as from about 0.35% actives to about 0.9% actives, from about 0.5% actives to about 0.7% actives, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A liquid ink, comprising:
    a pigment dispersion;
    a polyurethane dispersion;
    a polytetrafluoroethylene wax emulsion, wherein a particle diameter of a polytetrafluoroethylene wax in the polytetrafluoroethylene wax emulsion is from about 10 nm to less than 50 nm;
    a co-solvent; and
    a balance of water.

2. The liquid ink as defined in claim 1 wherein the polytetrafluoroethylene wax emulsion is present in the liquid ink in an amount ranging from about 0.25% actives to about 1% actives.

3. The liquid ink as defined in claim 1 wherein:
    the pigment dispersion is present in the liquid ink in an amount ranging from about 2% actives to about 5% actives;
    the polyurethane dispersion is present in the liquid ink in an amount ranging from about 1% actives to about 15% actives; and
    the co-solvent is present in the liquid ink in an amount ranging from about 2 wt % to about 20 wt %.

4. The liquid ink as defined in claim 1, further comprising a surfactant in an amount ranging from about 0.25 wt % to about 4 wt %.

5. The liquid ink as defined in claim 4 wherein the surfactant includes:
    a phosphate surfactant present in an amount ranging from about 0.25 wt % to about 2 wt %; and
    an acetylenic surfactant present an amount ranging from about 0.25 wt % to about 2 wt %.

6. The liquid ink as defined in claim 1, further comprising an additive selected from the group consisting of an antimicrobial agent, an anti-kogation agent, or a combination thereof.

7. The liquid ink as defined in claim 1 wherein the polyurethane dispersion is selected from the group consisting of an aromatic polyether polyurethane dispersion, an aliphatic polyether polyurethane dispersion, an aromatic polyester polyurethane dispersion, an aliphatic polyester polyurethane dispersion, an aromatic polycaprolactam polyurethane dispersion, an aliphatic polycaprolactam polyurethane dispersion, a vinyl-urethane hybrid polymer dispersion, an acrylic-urethane hybrid polymer dispersion, a dispersion of co-polymers thereof, and a combination thereof.

8. The liquid ink as defined in claim 1 wherein the co-solvent is a glycol ether, a humectant, or a combination thereof.

9. The liquid ink as defined in claim 1 wherein the liquid ink is free of any additional components.

10. The liquid ink as defined in claim 1 wherein the co-solvent is a glycol ether present in an amount ranging from about 2 wt % to about 12 wt %, based on a total wt % of the liquid ink.

11. The liquid ink as defined in claim 10 wherein the glycol ether is selected from the group consisting of ethylene glycol monobutyl ether, tripropyleneglycol methyl ether, dipropylene glycol butyl ether, and propylene glycol phenyl ether.

12. The liquid ink as defined in claim 1 wherein the co-solvent is a humectant present in an amount ranging from about 2 wt % to about 12 wt %, based on a total wt % of the liquid ink.

13. The liquid ink as defined in claim 1 wherein the liquid ink is free of any additional waxes.

14. The liquid ink as defined in claim 1, wherein the polyurethane dispersion is selected from the group consisting of an aromatic polycaprolactam polyurethane dispersion, an aliphatic polycaprolactam polyurethane dispersion, a vinyl-urethane hybrid polymer dispersion, an acrylic-urethane hybrid polymer dispersion, a dispersion of co-polymers thereof, and a combination thereof.

15. A thermal inkjet printing system, comprising:
    a liquid ink, including:
        a pigment dispersion;
        a polyurethane dispersion;
        a polytetrafluoroethylene wax emulsion, wherein a particle diameter of a polytetrafluoroethylene wax in the polytetrafluoroethylene wax emulsion is from about 10 nm to less than 50 nm;
        a co-solvent; and
        a balance of water; and
    a thermal inkjet printhead, including at least one thermal inkjet print nozzle.

16. The thermal inkjet printing system as defined in claim 15 wherein the polytetrafluoroethylene wax emulsion is present in the liquid ink in an amount ranging from about 0.25% actives to about 1% actives.

17. The thermal inkjet printing system as defined in claim 15 wherein the thermal inkjet printhead is filled with the liquid ink.

* * * * *